Patented Oct. 24, 1939

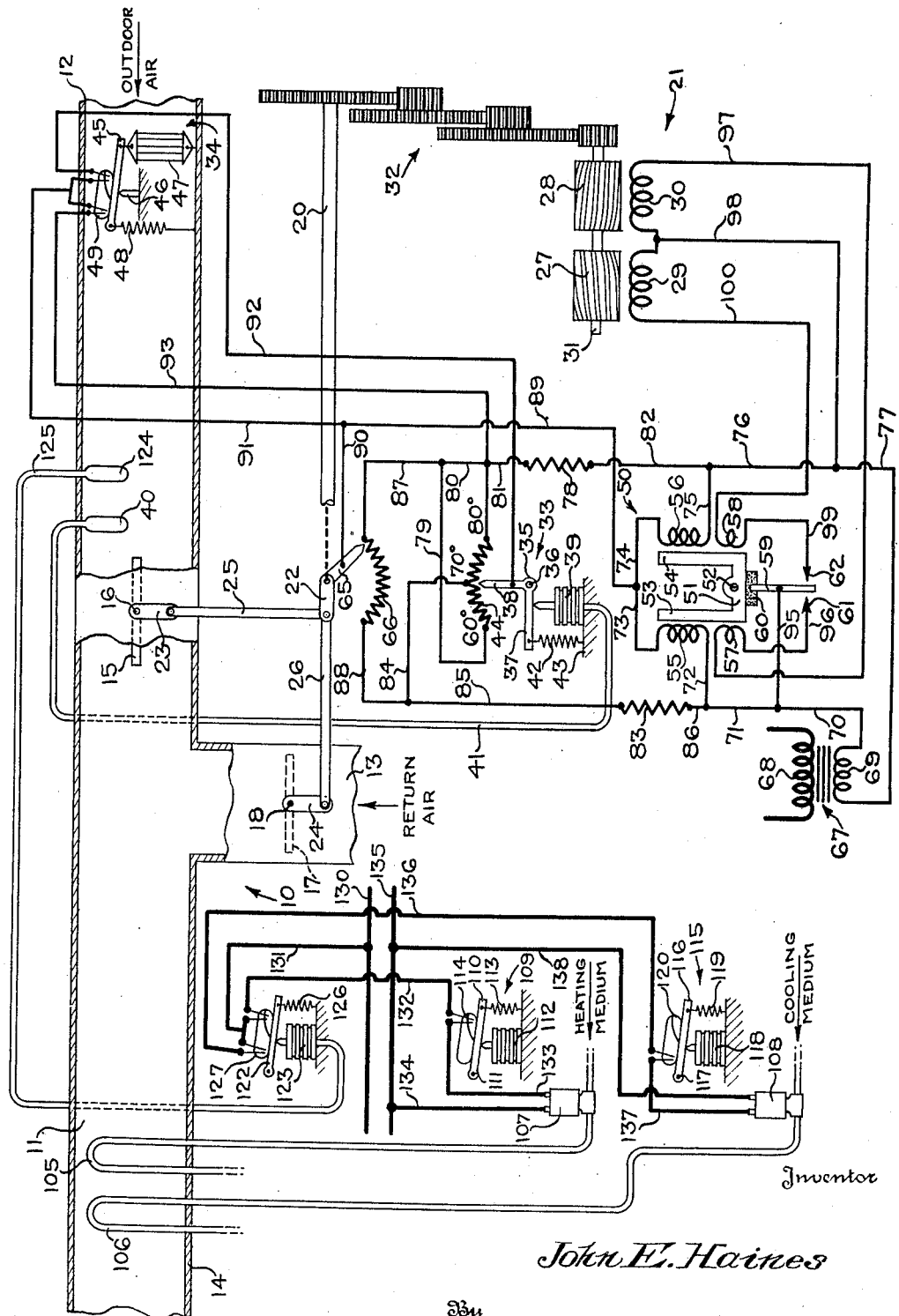

2,177,596

UNITED STATES PATENT OFFICE 2,177,596

CONTROL SYSTEM FOR AIR CONDITIONERS

John E. Haines, Minneapolis, Minn., assignor to Minneapolis-Honeywell Regulator Company, Minneapolis, Minn., a corporation of Delaware Application September 5, 1935, Serial No. 39,310

26 Claims. (Cl. 236—44)

The present invention relates to the control of air conditioning systems and is particularly concerned with what might be termed an "economizer control" wherein outdoor air or return air is selected for conditioning depending upon whether or not the outside conditions are such as to render the conditioning of such outside air uneconomical.

It will be readily appreciated that if the temperature of the outside air is relatively high or relatively low, or if the moisture content or relative humidity of the outside air is excessive, the amount of conditioning of such outside air necessary to bring the temperature and moisture content or relative humidity thereof to the desired standard may be so great as to render such a conditioning function uneconomical. Under such conditions, the present invention contemplates a partial or complete reduction of the use of outdoor air and the use of more or all return air, which is closer to the desired conditions, wherefor the conditioning operation is less expensive.

One of the objects of the present invention is the controlling of the amount of outdoor air flowing to an air conditioner in accordance with the temperature and moisture content or relative humidity of such outdoor air and in such manner that the supply of outdoor air to the conditioner is reduced as the temperature and moisture content of the outdoor air rises above a desired value.

A further object of the invention is the reducing of the flow of outdoor air to a conditioner if the temperature of the outdoor air either rises above or below an optimum value or a given standard and also reducing the supply of outdoor air to the conditioner in the event the moisture content or relative humidity of such outdoor air becomes too high.

Another object of the invention is the provision of apparatus which gradually reduces the flow of outdoor air to an air conditioner if the temperature of the outdoor air either rises above or falls below a predetermined optimum value or standard, or both, and also controlling the supply of outdoor air to the conditioner by the moisture content or relative humidity of the outdoor air.

Another object of the invention is the provision of an air conditioning system in which the amount of outdoor air supplied to the air conditioner is determined or controlled in the manners set forth above and then conditioning said air so as to maintain a desired standard or set of conditions in a space to be controlled.

Another object of the invention is the provision of a novel control system wherein a device to be controlled, such as a damper or the like, is moved from one extreme position to its other extreme position upon movement of a controller in either direction away from a predetermined or normal position.

Another object of the invention is the provision of a novel, electrical control system in which a motor means that is movable through a predetermined range is positioned at one extreme of such range when a controller is in a predetermined or normal position and is moved to its other extreme upon movement of the controller in either direction away from such predetermined or normal position.

Further objects of the invention include the provision of novel damper control systems and motor control systems of the class set out above in which an auxiliary switching mechanism, that may be automatic or otherwise, causes movement of such damper or motor means to one of its extreme positions irrespective of the condition of the controller.

Other objects of the invention comprise various combinations and sub-combinations of the systems set forth above as well as the details of such systems and will be found in the drawing, the detailed description and the appended claims.

For a better understanding of the invention, reference may be had to the following detailed description and the accompanying single drawing which is a diagrammatic showing of one form of the present invention.

Referring to the single drawing, an air conditioner, generally indicated at 10, comprises an air conditioning chamber 11 which communicates with an inlet or fresh air duct 12, a return air duct 13 and a duct 14 which communicates with the room or space to be conditioned or controlled. Located within the outdoor air duct 12 is a damper 15 that is secured to a pivoted shaft 16. This damper 15 is movable from the extreme position in which it is shown, wherein a full supply of outdoor air is allowed to pass to the air conditioning chamber 11, to another extreme position in which there is no flow or substantially no flow of outdoor air to this air conditioning chamber 11. The return air duct 13 is provided with a similar damper 17 which is secured to a similar pivoted shaft 18. This return air damper 17 is movable from the position shown wherein no return air flows to the air conditioning chamber 11 to the opposite extreme position in which a full flow of return air is allowed to flow to this chamber 11.

The outdoor air and return air dampers 15 and 17 are controlled by a single main operating shaft 20 of a motorized mechanism indicated generally at 21. This main operating shaft 20 controls a crank arm 22 which is connected to similar crank arms 23 and 24 through links 25 and 26. The crank 23 is connected to the shaft 16 to which the outdoor air damper 15 is secured and the crank 24 is connected to the shaft 18 to which the return air damper 17 is secured. Upon clockwise rotation of main operating shaft 20, as viewed from the left, the crank 22 will likewise move in clockwise direction and outdoor air damper 15 will be rotated in a counter-clockwise direction towards closed position while return air damper 17 will also be rotated in a counter-clockwise direction but towards open position. When the crank 22 has reached a substantially vertical position as the result of clockwise rotation, the outdoor air damper 15 will have been moved to closed position and the return air damper 17 will have been moved to full open position. The main operating shaft 20 is positioned by a reversible motor means that includes a pair of rotors 27 and 28 and cooperating field windings 29 and 30. The rotors 27 and 28 are secured to a common rotor shaft 31 which is in turn connected to the main operating shaft 20 through suitable reduction gearing, generally indicated at 32.

Energization of the field windings 29 and 30 is controlled by a pair of controllers indicated generally at 33 and 34. The controller 33 is a temperature responsive controller and is herein shown as comprising a bell-crank 35 pivoted at 36 and including arms 37 and 38. The arm 37 is positioned by a bellows 39 which is connected to a controlling bulb 40 by a small tube 41. As is well-known in the art, the bellows 39, bulb 40 and connecting tube 41 are charged with a suitable volatile fluid so that variable pressures are developed in bellows 39 in accordance with the temperature to which the controlling bulb 40 is subjected. The pressures thus developed in bellows 39 are opposed by a spring 42 which has one of its ends secured to the arm 37 and its other end secured to a suitable support 43. The arm 38 may be utilized to control the energizations of field windings 29 and 30 in any desired manner and is herein shown as controlling the energizations of these windings through the medium of a resistance 44 with which the arm 38 cooperates. In this embodiment of the invention, the controlling bulb 40 responds to the temperature of the outdoor air and is herein shown as conveniently located in the outdoor air inlet duct 12, it being appreciated that even when the outdoor air damper 15 is moved to closed position sufficient flow of outdoor air still remains to influence the bulb 40. As an example, when the temperature of the outdoor air is at 70° F., the control arm 38 engages the center of resistance 44 and the arrangement is such that control arm 38 respectively moves to the right and left-hand ends of resistance 44 as the outdoor temperature rises to 80° F. or falls to 60° F.

The controller 34 responds to the moisture content of the outdoor air and is herein shown as comprising a relative humidity responsive controller. This controller includes a lever 45 which is pivoted on a suitable support 46. A relative humidity responsive element 47, herein shown as comprising a plurality of strands of hair, has one of its ends secured to one end of lever 45 and its other end secured to a suitable support, herein shown as the outdoor air inlet duct 12. A spring 48 serves to maintain the humidity responsive element 47 under the proper tension and has one of its ends secured to the opposite end of lever 45 whereas its other end is secured to a suitable support, also shown herein as comprising the inlet duct 12. The lever 45 supports and operates a mercury switch 49. This mercury switch is of the double circuit type having electrodes in either end and the arrangement is such that the right-hand electrodes of this mercury switch are closed or bridged when the relative humidity of the outdoor air is below some predetermined value, such for example, as 60%. Whenever the relative humidity of the fresh air rises to or above 60%, the humidity responsive element 47 expands sufficiently to permit such a tilting of lever 45 that the right-hand electrodes of mercury switch 49 are opened and the left-hand electrodes thereof are closed. While the controller 34 is illustrated as an "on and off" type of controller, it will be obvious that other types of controllers could be utilized.

The controllers 33 and 34 control the energizations of field windings 29 and 30 through a balanced relay mechanism 50 which includes an armature 51 that is pivoted at 52. This armature 51 is provided with legs 53 and 54. A main relay winding 55 cooperates with the leg 53 whereas a main relay winding 56 cooperates with the leg 54. In addition, auxiliary windings 57 and 58 respectively, cooperate with the legs 53 and 54. The armature 51 positions a switch arm 59 that is secured to the armature 51 through the medium of a block of insulating material 60. This switch arm 59 is disposed between a pair of contacts 61 and 62. When relay winding 55 is energized sufficiently more highly than relay winding 56, armature 51 rotates in a clockwise direction about its pivot 52 and moves switch arm 59 into engagement with contact 61. Similarly, whenever relay winding 56 is energized sufficiently more highly than relay winding 55, armature 51 rotates in a counter-clockwise direction and switch arm 59 moves into engagement with contact 62. Whenever the relay windings 55 and 56 are substantially equally energized, or if both of them should be deenergized, switch arm 59 moves to the position shown wherein it is intermediate contacts 61 and 62 and does not engage either of them. The switch comprised by the switch arm 59 and the contacts 61 and 62 operates to selectively energize the field windings 29 and 30 and to also selectively energize the auxiliary windings 57 and 58 for a purpose which will appear hereinafter.

In the particular embodiment of the invention disclosed herein, the controller 33 operates to gradually position the main operating shaft 20 and therefore the outdoor air and return air dampers 15 and 17. Under these conditions, it is necessary for the motor mechanism 21 to also cooperate in the control of the switch defined by switch arm 59 and the contacts 61 and 62. This action is obtained in this particular arrangement of apparatus by having the main operating shaft 20 control a balancing contact 65 that cooperates with a balancing resistance 66.

Low voltage power is supplied to the various electrical devices described hereinabove by means of a transformer 67 having a high voltage primary 68, that may be connected to suitable line wires, and a low voltage secondary 69. The relay coils 55 and 56, in series, are connected across this secondary 69 by a circuit as follows: secondary 69, wire 70, wire 71, wire 72, relay coil 55, wire 73, wire 74, relay coil 56, wire 75, wire 76, and wire 77 back to the secondary 69. The control resistance 44 has both of its ends connected to the lower end of relay winding 56 and to the right-hand end of secondary 69, by being connected to the junction of wires 75 and 76, through a protective resistance 78, by wires 79, 80, 81 and 82. The center of control resistance 44 is connected to the lower end of relay coil 55 and to the left-hand side of secondary 69 by being connected to the junction of wires 71 and 72, through a protective resistance 83, by means of wires 84, 85 and 86. The balancing resistance 66 is connected in parallel with the series-connected relay coils 55 and 56, through the protective resistances 78 and 83, by having its opposite ends respectively connected to the junction of wires 79 and 80 and the junction of wires 84 and 85 by wires 87 and 88. The junction of wires 73 and 74, and therefore the upper ends of each of the relay coils 55 and 56, is permanently connected to the balancing contact 65 by wires 89 and 90. The junction of wires 89 and 90 is connected to one each of the left-hand and right-hand terminals of the mercury switch 49 by a wire 91 and the other right-hand terminal of mercury switch 49 is connected to the control arm 38 by a wire 92 whereby, whenever the relative humidity of the fresh air is below 60%, the control arm 38 is connected to the junction of wires 73 and 74 and therefore to the upper ends of both relay windings 55 and 56. The other left-hand terminal of the mercury switch 49 is connected to the junction of wires 80 and 81 by a wire 93 so that whenever the relative humidity of the outdoor air is at or above 60%, the upper ends of both relay windings 55 and 56 are connected to the lower end of relay winding 56 through the protective resistance 78.

With the parts in the position shown and following the arbitrary values of temperature and relative humidity given above, the outdoor air temperature is 70° F., and its relative humidity is below 60%. As a result, contact arm 38 is engaging the center of control resistance 44 so that it is directly connected to the wire 84 without there being any interposed resistance. Also, the mercury switch 49 has its right-hand electrodes closed so that this control arm 38 is connected to the upper ends of relay coils 55 and 56. Balancing contact 65 is engaging the extreme right-hand end of balancing resistance 66. Under these conditions, relay winding 55 is substantially short-circuited, complete short-circuiting being prevented by the protective resistance 83. This substantial short-circuit is as follows: from the upper end of relay winding 55, wire 73, wire 89, wire 91, the right-hand electrodes of mercury switch 49, wire 92, control arm 38, wire 84, wire 85, protective resistance 83, wire 86, and wire 72 to the lower end of relay winding 55. The relay winding 56 is also substantially short-circuited, complete short-circuiting being prevented by the companion protective resistance 78. This substantial short-circuit is as follows: from the upper end of relay winding 56, wire 74, wire 89, wire 90, balancing contact 65, wire 87, wire 80, wire 81, protective resistance 78, wire 82 and wire 75 to the lower end of relay winding 56. The voltage drops across relay windings 55 and 56 are therefore both equal and a small amount of current is flowing through each of these relay windings. Since the current flow through the relay windings is equal, the armature 51 is in the intermediate position shown wherein switch arm 59 is between contacts 61 and 62 and is not engaging either one of them. Both field windings 29 and 30 are therefore deenergized and the parts are stationary. The outdoor air damper 15 is completely open and the return air damper 17 is completely closed.

If the outdoor temperature should now either rise above or fall below 70° F., control arm 38 will move towards either the right-hand or left-hand end of control resistance 44. Irrespective of which way this control arm 38 moves, part of the resistance 44 will be placed in the partial short-circuit above described for the relay winding 55. As a result, the voltage drop across relay winding 55 is increased and more current flows through this relay winding. Armature 51 therefore rotates in a clockwise direction and switch arm 59 moves into engagement with contact 61. Such engagement of these parts energizes the field winding 30 and the auxiliary winding 57 through a circuit as follows: secondary 69, wire 70, wire 95, switch arm 59, contact 61, wire 96, auxiliary winding 57, wire 97, field winding 30, wire 98, and wire 77 to the other side of secondary 69. Energization of this auxiliary winding 57 places an additional attractive force on leg 53 of armature 51, tending to rotate armature 51 in a clockwise direction, whereby switch arm 59 is held firmly in engagement with contact 61. Energization of field winding 30 causes rotation of main operating shaft 20 in a clockwise direction, as viewed from the left. Such rotation of main operating shaft 20 rotates fresh air damper 15 and return air damper 17 in counterclockwise direction to decrease the supply of outdoor air to the air conditioning chamber 11 and increases the supply of return air thereto. Such movement of the main operating shaft 20 also moves balancing contact 65 along balancing resistance 66 towards its left-hand end. This movement of balancing contact in respect to balancing resistance 66 places more and more of the balancing resistance 66 in the partial short-circuit for the relay winding 56 described above. As a result, the voltage drop across relay winding 56 is increased and more current flows therethrough. When the current flow through the relay winding 56 has thus been increased sufficiently, switch arm 59 will slightly disengage contact 61. The circuit through auxiliary winding 57 and field winding 30 is thereupon interrupted. Interruption of the circuit through auxiliary winding 57 releases the additional attractive force upon armature 51 whereupon switch arm 59 moves further away from contact 61 and thereby insures a good, clean break between these parts. Main operating shaft 20 ceases rotation upon deenergization of field winding 30. The dampers 15 and 17 are now in a position corresponding to the new position of control arm 38 and it should be noted that dampers 15 and 17 assume the same position and move in the same direction irrespective of whether the control arm 38 moves to the right or to the left of the center of resistance 44.

Continued rise or fall in the outdoor temperature accompanied by continued movement of control arm 38 towards its right-hand end or continued movement thereof towards its left-hand end causes further closing of the outdoor air damper 15 and further opening of the return air damper 17. If the outdoor temperature rises to 80° F. or falls to 60° F., relay coil 56 is substantially short-circuited, irrespective of the position of balancing contact 65, by a circuit as follows: from the upper end of relay winding 56, wire 74, wire 89, wire 91, the right-hand electrodes of mercury switch 49, wire 92, control arm 38, wire 81, (either directly or through wires 79 and 80) protective resistance 78, wire 82, and wire 75 to the lower end of relay winding 56. The energizations of relay windings 55 and 56 can now only be substantially equalized by movement of main operating shaft 20 to an extreme position in which the outdoor air damper 15 is completely closed, the return air damper 17 completely opened, and the balancing contact 65 is engaging the extreme left-hand end of balancing resistance 66 so that it is directly connected to wire 88. When these positions are assumed, relay winding 55 is substantially short-circuited as follows: from the upper end of relay winding 55, wire 73, wire 89, wire 90, balancing contact 65, wire 88, wire 85, protective resistance 83, wire 86, and wire 72 to the lower end of relay winding 55. The parts will therefore move to the extreme position described above before the field winding 30 will be deenergized.

Whenever the outdoor air temperature returns towards 70° F. so that control arm 38 moves towards the center of resistance 44, relay winding 56 will become more highly energized than relay winding 55 whereupon switch arm 59 moves into engagement with contact 62. Auxiliary winding 58 and field winding 29, in series, are then energized as follows: secondary 69, wire 70, wire 95, switch arm 59, contact 62, wire 99, auxiliary winding 58, wire 100, field winding 29, wire 98 and wire 77 to the other side of secondary 69. Rotor 27 now rotates main operating shaft 20 in a counter-clockwise direction as viewed from the left. Outdoor air damper 15 therefore rotates in clockwise direction towards its full open position, return air damper 17 rotates in the same direction towards its closed position and balancing contact 65 moves along balancing resistance 66 towards its right-hand end. Energization of the auxiliary winding 58 increases the pull on armature 51 to maintain switch arm 59 in firm contact with contact 62. When the main operating shaft 20 has thus been moved to a position corresponding to the new position of control arm 38, the energizations of relay windings 55 and 56 will be sufficiently equalized to cause switch arm 59 to slightly separate from contact 62. This interrupts the circuit for auxiliary winding 58 and field winding 29. Deenergization of the auxiliary winding 58 removes the auxiliary pull on armature 51 so that switch arm 59 moves further away from contact 62. Deenergization of field winding 29 results in stopping of the main operating shaft 20.

If the outdoor air temperature again returns to 70° F., the parts return to the position shown wherein main operating shaft 20 is in an extreme position with outdoor air damper 15 wide open, return air damper 17 fully closed, and balancing contact 65 engaging the extreme right-hand end of balancing resistance 66. While both extreme positions have been indicated as being obtained through a balancing out process of the energizations of relay windings 55 and 56 by the balancing potentiometer comprised by contact 65 and resistance 66, in actual practice it is preferable to provide limit switches for limiting the movement of main operating shaft 20, as is well-known in the art, rather than depending upon such exact balancing out for the extreme positions.

If the relative humidity of the outdoor air should rise to or above 60% at any time, mercury switch 49 will move to the opposite position wherein its left-hand electrodes are bridged and its right-hand electrodes are open. Under these conditions, the control arm 38 is disconnected from the junction of relay windings 55 and 56 so that the controller 33 no longer has any influence as to the position which main operating shaft 20 will assume. Also, under these conditions, the relay winding 56 is substantially short-circuited as follows: from the upper end of relay winding 56, wire 74, wire 89, wire 91, the left-hand electrodes of mercury switch 49, wire 93, wire 81, protective resistance 78, wire 82, and wire 75 to the lower end of relay winding 56. Switch arm 59 therefore engages contact 61 and the main operating shaft 20 is rotated in clockwise direction to its extreme position in which balancing contact 65 engages the extreme left-hand end of balancing resistance 66 so as to again substantially equalize the energizations of relay windings 55 and 56. It will therefore be seen that whenever the relative humidity of the outdoor air rises to or above 60%, the main operating shaft 20 and the associated dampers 15 and 17, as well as balancing contact 65 will move to the opposite extreme positions irrespective of the temperature of the outdoor air.

It will be noted that the air conditioning chamber 11 is shown as provided with a heating coil 105 and a cooling coil 106. The heating coil 105 is connected to a suitable source of heating medium through an electrically operable valve 107 and the cooling coil 106 is similarly connected to a suitable source of cooling medium through an electrically operable valve 108. Valve 107 is controlled primarily by a space temperature responsive thermostat indicated generally at 109. This thermostat includes a switch arm 110 pivoted at 111 which is adapted to be positioned by a bellows 112. This bellows 112 is charged with a suitable volatile fluid as is usual in the art and the variable pressures generated therein in response to temperature changes are opposed by a spring 113. The pivoted arm 110 operates a mercury switch 114 and the arrangement is such that mercury switch 114 moves to closed position whenever the temperature of the space falls below some desired value such as 68° F.

In a similar manner, the cooling coil valve 108 is controlled by a space temperature responsive thermostat 115 that includes a switch carrier 116 that is pivoted at 117. This switch carrier 116 is operated by a bellows 118 that is charged with a suitable volatile fluid and the variable pressures created in the bellows 118 are opposed by a spring 119. The switch carrier 116 carries and operates a mercury switch 120 which moves to closed-circuit position whenever the space temperature rises to some undesired high value, such as 75° F.

The controller 109 is placed in control of the heating valve 107 or the controller 115 is placed in control of the cooling valve 108 by an automatic mechanism which herein takes the form of an outdoor temperature responsive controller 121. This controller includes a pivoted switch carrier 122 which is operated by a bellows 123 that is connected to a controlling bulb 124 by a tube 125. This bellows, bulb and tube are charged with a suitable volatile fluid and the variable pressures created in the bellows 123 are opposed by a spring 126. The switch carrier 122 carries a double-ended mercury switch 127 and the arrangement is preferably such that the left-hand electrodes of mercury switch 127 are closed when the outdoor temperature rises to some value, such as 75° F., and remain closed until the outdoor temperature falls to some considerably lower value such as 65° F.

With the parts in the position shown, the right-hand electrodes of mercury switch 127 are closed so that controller 109 is in control of the heating valve 107. If the temperature of the space should therefore fall to 68° F., so as to close mercury switch 114, valve 107 is energized as follows: line wire 130, wire 131, right-hand electrodes of mercury switch 127, wire 132, mercury switch 114, wire 133, valve 107, and wire 134 to line wire 135. Valve 107 is therefore opened and the heating medium flows to the heating coil 105 to heat the air passing through the air conditioning chamber 11.

In a similar manner, when the outdoor temperature is relatively high so that the left-hand electrodes of mercury switch 127 are closed, controller 115 takes control of cooling valve 105 and energizes the same whenever the space temperature rises to or above 75° F. by a circuit as follows: line wire 130, wire 131, left-hand electrodes of mercury switch 127, wire 136, mercury switch 120, wire 137, cooling valve 108, and wire 138 to line wire 135.

From the foregoing, it will be seen that I have provided a novel air conditioning system in which the air delivered to a space to be controlled is treated as necessary in order to maintain desired conditions within the space. Further, this air which is conditioned and delivered to the space is selected from the outdoors and the space in a manner determined by conditions outside of the space. Specifically, the supply of outdoor air to the air conditioner is reduced if the outside temperature either rises above or falls below an optimum value or desired standard and is also reduced if the moisture content or relative humidity of the outdoor air becomes too high. This control of the outdoor air is further obtained by a novel motorized mechanism which moves the dampers 15 and 17 from one extreme position to another, and in the same direction, upon movement of a controller in either direction away from a normal or desired position. It will be appreciated that this novel motorized mechanism has many other uses than those specifically disclosed herein.

It will readily be seen that many changes and modifications of the present system can be made without departing from the invention and I therefore intend to be limited only by the scope of the appended claims.

I claim:

1. In an air conditioning system of the class described, in combination, means in control of the flow of outdoor air to a space, means responsive to the temperature of the outdoor air in control of said outdoor air flow controlling means operative gradually to reduce the flow of outdoor air to said space from a maximum to a minimum as the outdoor air temperature rises above a selected value, and means responsive to the moisture content of the outdoor air operative to control the outdoor air flow controlling means to reduce the flow of outdoor air to said space to a minimum irrespective of the temperature of the outdoor air if the moisture content thereof reaches a predetermined high value.

2. An air conditioning system, comprising, in combination, damper means in control of the flow of outdoor air to a space, means responsive to the temperature of the outdoor air in control of said damper means to reduce the flow of outdoor air to the space if the temperature of the outdoor air rises above or falls below a given standard, and means responsive to the moisture content of the outdoor air in control of said damper means operative to reduce the supply of outdoor air to said space if the moisture content of the outdoor air becomes too high.

3. In combination, damper means in control of the supply of outdoor air to a space, means responsive to the temperature of the outdoor air in control of said damper means operative to gradually reduce the supply of outdoor air to the space from a maximum to a minimum as the outdoor air temperature rises above or falls below a predetermined standard, and means responsive to the relative humidity of the outdoor air in control of said damper means operative to reduce the supply of outdoor air to said space to a minimum if the relative humidity of the outdoor air becomes excessive.

4. In a graduated control system, in combination reversible motor means movable through a selected range, switching means, circuits controlled thereby in control of said motor means to move the same in opposite directions, relay means in control of said switching means including first and second coils operable to control said switching means in a manner to cause rotation of said motor means in a first direction when said first coil is more highly energized than the second and to cause reverse movement of said motor means when said second coil is energized more highly than the first, resistance means operated by said motor means to rebalance the energizations of said coils, a variable resistance controller operative to increase the energization of said first coil over said second coil upon movement of said controller in either direction from a selected position, and a switch associated with said coils operable to cause said first coil to be more highly energized than the second irrespective of the position of said controller.

5. In combination, a pair of electromagnetic coils connected in series across a source of power, a control contact connected to the junction of said coils, a control resistance having both of its ends connected to the other end of the first of said coils and an intermediate portion connected to the other end of the second of said coils, whereby engagement of said contact with such intermediate point of the control resistance operatively deenergizes said second coil and movement of the control contact away from such intermediate point of the control resistance towards either end thereof increases the energization of said second coil and decreases the energization of the first coil, and means to be position controlled by the conjoint action of said coils.

6. In combination, a pair of electromagnetic coils connected in series across a source of power, a control contact connected to the junction of said coils, a control resistance having both of its ends connected to the other end of the first of said coils and an intermediate portion connected to the other end of the second of said coils, whereby engagement of said contact with such intermediate point of the control resistance operatively deenergizes said second coil and movement of the control contact away from such intermediate point of the control resistance towards either end thereof increases the energization of said second coil and decreases the energization of the first coil, switching means operated by the conjoint action of said coils, motor means controlled by said switching means, and means controlled by said motor means in control of said switching means.

7. In combination, a pair of electromagnetic coils connected in series across a source of power, a control contact connected to the junction of said coils, a control resistance having both of its ends connected to the other end of the first of said coils, and an intermediate portion connected to the other end of the second of said coils, whereby engagement of said contact with such intermediate point of the control resistance operatively deenergizes said second coil and movement of the control contact away from such intermediate point of the control resistance towards either end thereof increases the energization of said second coil and decreases the energization of the first coil, switching means operated by the conjoint action of said coils, motor means controlled by said switching means and a two-position switch connected to said coils and contact operable when moved to a selected position to disconnect said contact from the junction of said coils and to operatively deenergize said first coil.

8. In combination, a pair of electromagnetic coils connected in series across a source of power, a control contact connected to the junction of said coils, a control resistance having both of its ends connected to the other end of the first of said coils and an intermediate portion connected to the other end of the second of said coils, whereby engagement of said contact with such intermediate point of the control resistance operatively deenergizes said second coil and movement of the control contact away from such intermediate point of the control resistance towards either end thereof increases the energization of said second coil and decreases the energization of the first coil, switching means operated by the conjoint action of said coils, motor means controlled by said switching means, and variable resistance means operated by said motor means to maintain the energizations of said coils equal.

9. In combination, a pair of electromagnetic coils connected in series across a source of power, a control contact connected to the junction of said coils, a control resistance having both of its ends connected to the other end of the first of said coils and an intermediate portion connected to the other end of the second of said coils, whereby engagement of said contact with such intermediate point of the control resistance operatively deenergizes said second coil and movement of the control contact away from such intermediate point of the control resistance towards either end thereof increases the energization of said second coil and decreases the energization of the first coil, switching means operated by the conjoint action of said coils, motor means controlled by said switching means, variable resistance means operated by said motor means to maintain the energization of said coils equal, and a two-position switch connected to said coils and contact operable to disconnect said contact from the junction of said coils and to deenergize said first coil when such switching means is moved to a selected position.

10. In a system for controlling the flow of outdoor air to a space, in combination, a damper in control of the flow of outdoor air to the space, reversible motor means operable to move said damper towards closed position when operated in a first direction and to return the damper towards open position when operated in the reverse direction, an electrical controller responsive to the outdoor temperature in control of said motor means operative to move the same in said first direction upon rise or fall of the outdoor air temperature above or below a desired standard, and means responsive to the relative humidity of the fresh air to move said motor means in said first direction upon rise in such relative humidity.

11. In a system for controlling the flow of outdoor air to a space, a damper in control of the flow of outdoor air to the space, reversible motor means in control of said damper means operable to move said damper from open position to closed position when moving in one direction and from closed position to open position when moving in the opposite direction, switching means, circuits controlled thereby operable to cause movement of said motor means in damper closed direction when in a first position and movement of said motor means in damper opening direction when in a second position, said switching mechanism having a third position in which said motor means does not move in either direction, first and second normally equally energized electromagnetic coils in control of said switching means operative to maintain said switching means in its third position when both coils are equally energized and to selectively move the switching means to its first or second position when the first or second coil is more highly energized than the other, resistance means operated by the motor means electrically connected to said coils to maintain the energizations of said coils equal, a variable resistance controller responsive to the temperature of the outdoor air electrically connected to said coils operative to increase the energization of said first coil over said second coil upon variation of the outdoor air temperature above or below a selected standard, and means responsive to the relative humidity of the outdoor air to energize said first coil more highly than the second upon an increase in the outdoor air relative humidity to a given value.

12. In combination, damper means in control of the flow of outdoor air to a space, electric motor means in control of said damper means, circuit connections including an outdoor temperature responsive variable resistance in control of said motor means operative to control said motor means in a manner to graduatingly reduce the supply of outdoor air to the space as the outdoor temperature rises above a given value, and an outdoor air moisture responsive switch also in control of said motor means operative to move the same to a predetermined position upon rise in the moisture content of such outdoor air to a predetermined value.

13. In a system for controlling the flow of outdoor air to a space, in combination, a damper in control of the flow of outdoor air to the space, reversible motor means operable to move said damper towards closed position when operated in a first direction and to return the damper towards open position when operated in the reverse direction, an electric controller responsive to the outdoor temperature in control of said motor means operative to move the same in said first direction upon rise in the outdoor temperature above a selected value, and means responsive to the relative humidity of the outdoor air operative to move said motor means in said first direction and to a given position upon rise in such relative humidity to a selected value.

14. In an air conditioning system, in combination, a conditioning chamber through which air is adapted to be passed, means for causing a flow of air through said conditioning chamber and to a space to be conditioned, means for withdrawing air from said space and for passing it to said conditioning chamber, fresh air supply means for said conditioning chamber, a fresh air flow controller for regulating the flow of fresh air into said conditioning chamber, motor means for variably positioning said controller, outside temperature influenced thermostatic means for controlling said motor means, said thermostatic means and said motor means being arranged to normally adjust said flow controller in a manner to decrease the fresh air supply upon decrease in the temperature of said thermostatic means, and condition responsive means for also controlling said motor means, said condition responsive means being arranged to affect said motor means in a manner to cause reduction of said fresh air supply to a minimum independently of said thermostatic means whenever said condition varies to a predetermined value.

15. In an air conditioning system, in combination, a conditioning chamber through which air is adapted to be passed, means for causing a flow of air through said conditioning chamber and to a space to be conditioned, means for withdrawing air from said space and for passing it to said conditioning chamber, fresh air supply means for said conditioning chamber, a fresh air flow controller in control of the flow of fresh air into said conditioning chamber, reversible electric motor means for positioning said controller, thermostatic means influenced by outside temperature, circuit connections controlled thereby in control of said electric motor means and operative to energize said electric motor means in a manner to operate said air flow controller to a position preventing the supplying of fresh air to said conditioning chamber when the temperature of said thermostatic means rises above a predetermined value or falls below a lower predetermined value, and condition responsive means also controlling said circuit connections for said electric motor means and arranged to cause reduction in the flow of fresh air to said conditioning chamber whenever said condition varies to a predetermined value irrespective of the temperature of said thermostatic means.

16. In combination, damper means in control of the flow of outdoor air to a space, an electric motor means for positioning said damper means, a temperature responsive variable resistance controller operatively associated with said motor means for causing said motor means to position said damper means in positions corresponding to the value of temperature at said temperature responsive controller, switching means connected to said motor means in a manner to place said motor means under the control of said controller when said switching means is in one position while causing said motor means to run to a predetermined position when said switching means is in another position, and humidity responsive means for actuating said switching means.

17. In an air conditioning system, in combination, damper means in control of the flow of fresh air to a space, motor means for positioning said damper means, means including a thermostat for controlling said motor means in a manner to vary the flow of fresh air to said space in accordance with variations in temperature at said thermostat, a controller for said motor means arranged when in one position to place said motor means under the control of said thermostat and when in another position to cause operation of said motor means for operating said damper to a predetermined flow position, and a humidity responsive device for actuating said controller.

18. In an air conditioning system, in combination, damper means in control of the flow of fresh air to a space, motor means for positioning said damper means, means including a thermostat for controlling said motor means in a manner to vary the flow of fresh air to said space in accordance with variations in temperature at said thermostat, a controller for said motor means arranged when in one position to place said motor means under the control of said thermostat and when in another position to cause operation of said motor means for operating said damper to a predetermined flow position, and a humidity responsive device for positioning said controller in said first position when the humidity at said humidity responsive device is below a predetermined value, and for positioning said controller in said second position when the humidity is above said predetermined value.

19. In a control system, in combination, a device to be controlled, reversible power operated motor means for actuating said device from one position to another, a controller having moveable member means movable from an intermediate position in either direction, control means actuated in response to said movable member means assuming said intermediate position for causing said motor means to drive said device to be controlled to one end of its desired range of movement, means including at least a portion of said control means for causing said motor means to operate in a direction to drive said device to be controlled away from said end of its range of movement in response to movement of said movable member means in one direction away from said intermediate position, and means including at least a portion of said control means for causing operation of said motor means in the same direction upon movement of said movable member means in the opposite direction away from said intermediate position.

20. In a control system, in combination, a device to be controlled, reversible power operated motor means for actuating said device from one position to another, a controller having movable member means movable from an intermediate position in either direction, means contacted by said movable member means when said movable member means is in said intermediate position for causing said motor means to drive said device to be controlled to one end of its desired range of movement, means contacted by said movable member means in moving in one direction from said intermediate position for causing said motor means to drive said device to be controlled away from said end of its range of movement, and means contacted by said movable member means in moving in the opposite direction from said intermediate position for causing said motor means to operate in the same direction to move said device to be controlled from said end of its desired range of movement.

21. In a control system, in combination, a device to be controlled, reversible power operated motor means for actuating said device from one position to another, a controller having movable member means movable from an intermediate position in either direction, means controlled by said movable member means for causing said motor means to drive said device to be controlled from one end of its normal range of movement towards its other end as said movable member means moves in one direction from said intermediate position, and means also controlled by said movable member means for causing operation of said motor means in the same direction as said movable means moves in the opposite direction from said intermediate position.

22. In an air conditioning system, in combination, a fresh air duct for supplying fresh air to a space to be conditioned, damper means for controlling the flow of fresh air, power operated motor means for actuating said damper means, a condition responsive device, movable member means actuated by said condition responsive device and capable of movement by said condition responsive device from an intermediate position in either direction, means controlled by said movable member means for causing said motor means to drive said damper means from one end of its normal range of movement towards its other end when said movable member moves in one direction from said intermediate position, and means also controlled by said movable member means for causing operation of said motor means in the same direction as said movable means moves in the opposite direction from said intermediate position.

23. In a graduated control system, in combination, reversible motor means movable through a selected range, switching means, circuits controlled thereby in control of said motor means to move the same in opposite directions, relay means in control of said switching means including first and second coils operable to control said switching means in a manner to cause rotation of said motor means in a first direction when said first coil is more highly energized than the second, and to cause reverse movement of said motor means when said second coil is energized more highly than said first, resistance means operated by said motor means to rebalance the energizations of said coils, a variable resistance controller comprising a pair of resistances and movable member means for contacting said resistances, said movable member means being arranged to traverse said resistances in sequence, and connections between said movable member means and said coils and between said resistances and said coils to cause traversing by said movable member means over one of said resistances in one direction to have the same effect on the relative energizations of said coils as traversing by said movable member means in the opposite direction over said other resistance.

24. In a graduated control system, in combination, reversible motor means movable through a selected range, switching means, circuits controlled thereby in control of said motor means to move the same in opposite directions, relay means in control of said switching means to selectively cause rotation of said motor means in either direction or to stop said motor means, control means for said relay means including a first current controlling device, a second current controlling device, and movable member means for controlling said first current controlling means upon movement in one direction from an intermediate position while controlling said second current controlling means upon movement in the opposite direction from an intermediate position, and connections between said current controlling means and said relay means so that movements of the movable member in either direction from intermediate position has the same effect upon said relay means.

25. In a control system, in combination, an electro-magnetic device to be controlled, a controller having movable member means movable from an intermediate position in either direction, a control circuit for said electro-magnetic device, a pair of resistances connected in parallel into said control circuit, means for varying one only of said resistances upon movement of said movable member means in one direction from said intermediate position, and means for varying the other only of said resistances in the same manner upon movement of said movable member means in the opposite direction from said intermediate position.

26. In a control system, in combination, an electro-magnetic device to be controlled, a controller having movable member means movable from an intermediate position in either direction, a control circuit for said electro-magnetic device, a pair of current controlling means connected in parallel into said control circuit, means for varying one only of said current controlling means upon movement of said movable member means in one direction from said intermediate position, and means for varying the other only of said current controlling means in the same manner upon movement of said movable member means in the opposite direction from said intermediate position.

JOHN E. HAINES.